(12) United States Patent
Fujimoto

(10) Patent No.: US 7,827,002 B2
(45) Date of Patent: Nov. 2, 2010

(54) CONTACT DISPLACEMENT METER

(75) Inventor: Suketaka Fujimoto, Osaka (JP)

(73) Assignee: Keyence Corporation, Osaka (JP)

( * ) Notice: Subject to any disclaimer, the term of this patent is extended or adjusted under 35 U.S.C. 154(b) by 136 days.

(21) Appl. No.: 12/392,178

(22) Filed: Feb. 25, 2009

(65) Prior Publication Data

US 2009/0248351 A1    Oct. 1, 2009

(30) Foreign Application Priority Data

Mar. 25, 2008    (JP) ............... 2008-079241

(51) Int. Cl.
*G06F 15/00* (2006.01)
*G01B 11/14* (2006.01)
(52) U.S. Cl. .................................... 702/150
(58) Field of Classification Search ............... 702/150, 702/159
See application file for complete search history.

(56) References Cited

U.S. PATENT DOCUMENTS

| 5,035,507 | A  | * | 7/1991  | Nishioki et al. ......... 356/499 |
| 6,958,469 | B2 | * | 10/2005 | Ishizuka ............... 250/231.16 |
| 7,400,991 | B2 |   | 7/2008  | Fukumura |
| 2002/0018220 | A1 | * | 2/2002 | Aoki .................... 356/614 |
| 2002/0021450 | A1 | * | 2/2002 | Aoki .................... 356/499 |

FOREIGN PATENT DOCUMENTS

| JP | 05-346330    | 12/1993 |
| JP | 07-270186    | 10/1995 |
| JP | 07-270187    | 10/1995 |
| JP | 07-280515    | 10/1995 |
| JP | 07-280521    | 10/1995 |
| JP | 10-274501    | 10/1998 |
| JP | 2000-241115  | 9/2000  |
| JP | 2003-106872  | 4/2003  |

* cited by examiner

*Primary Examiner*—Tung S Lau
*Assistant Examiner*—Cindy H Khuu
(74) *Attorney, Agent, or Firm*—Kilyk & Bowersox P.L.L.C.

(57) ABSTRACT

A contact displacement meter capable of performing an accurate displacement measurement where a movement speed of a contact is fast and having high resistance property to optical noise. A reference light passing regions are away from each other by a distance of a unique value in a movement scale. A peak position of the reference light passing region at which a received light signal of light passed through the reference light passing region takes a local maxim is detected, and an absolute position of the reference light passing region is specified based on the distance between the adjacent peak positions. A relative position of the reference light passing region with respect to a line sensor is specified based on a received light signal of light passed through a lattice region. A displacement of the contact is calculated based on the specified absolute position and the relative position.

5 Claims, 12 Drawing Sheets

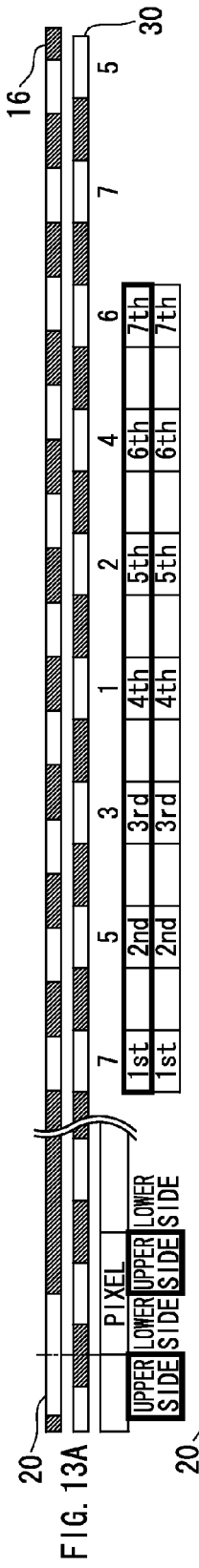

CONTACT DISPLACEMENT METER

CROSS-REFERENCE TO RELATED APPLICATIONS

The present application claims foreign priority based on Japanese Patent Application No. 2008-079241, filed Mar. 25, 2008, the contents of which is incorporated herein by reference.

BACKGROUND OF THE INVENTION

1. Field of the Invention

The present invention relates to contact displacement meters, in particular, to an optical absolute type contact displacement meter for reading a relative displacement of a built-in scale with a line sensor.

2. Description of the Related Art

The contact displacement meter includes a contact attached so as to be movable with respect to a housing, and measures the displacement of a measuring object by contacting the contact to the measuring object and measuring the relative displacement of the contact with respect to the housing with a detector incorporated in the housing. The detector incorporated in the housing may be configured by a magnet and a differential transformer, may be configured by a scale formed with a predetermined pattern and an electrostatic capacity, magnetic, optical sensor or the like for reading the scale.

Among these contact displacement meters, the contact displacement meter for reading the pattern formed on the scale using light can realize a high precision displacement meter in a relatively easy manner by enhancing the mechanical formation accuracy of the pattern.

However, demand for miniaturization is strong as the contact displacement meter is often used by being attached to a device, and the optical detector incorporated in the housing is generally configured as a so-called incremental type for counting the scale pattern due to restrictions in size of the light emitting element, the light receiving element, and the like.

As an optical absolute position length measuring device for reading the relative displacement of the scale with a line sensor, for example, Japanese Unexamined Patent Publication No. 2000-241115 discloses a length measuring device capable of obtaining an absolute position by irradiating light emitted by a light emitter onto a transition lattice part including an absolute position pattern that provides absolute position information and a precision optical lattice, and analyzing the output received by a light receiving element arrayed at a predetermined interval.

The absolute position length measuring device disclosed in Japanese Unexamined Patent Publication No. 2000-241115 first specifies a coarse absolute position using the absolute position pattern. The relative position is then calculated based on the output signal by the light passed through the precision optical lattice, and the relative position is then added or subtracted to or from the coarse absolute position to obtain the fine absolute position.

The contact displacement meter incorporating the incremental optical detector can respond to the demand of miniaturization, demand of higher accuracy, and the like. However, if the contact is suddenly moved, miscounting of the scale pattern occurs, and a correct measurement result cannot be obtained.

In optically measuring the absolute position of the contact, the absolute position information of the transition lattice part that moves with the contact need to be reliably read. When calculating the absolute position by the difference in the received light signal at the light receiving element as in the absolute position length measuring device disclosed in Japanese Unexamined Patent Publication No. 2000-241115, an elaborate parallel light needs to be irradiated on the absolute position pattern and the precision optical lattice.

However, it is difficult to have the light irradiated from the light source as a precise parallel light, and furthermore, even in a case where a precise parallel light is generated, unnecessary reflection occurs at the boundary edge portion of a light shielding region and a light passing region of the pattern, leakage light (or leakage charge) to the adjacent pixel occurs at the image sensor, and the like, and thus an ideal received light waveform as disclosed in Japanese Unexamined Patent Publication No. 2000-241115 is difficult to obtain. Thus, the received light signal at the light receiving element includes various optical noises, reading of the absolute position information becomes difficult only from the received light signal of the light passed through the absolute position pattern and the precision optical lattice, and sufficient measurement accuracy cannot be ensured.

In the case of a Fourier image type as shown in Japanese Unexamined Patent Publication No. 05-346330, a diffraction phenomenon occurs with respect to the light passed through the fine absolute position pattern and the precision optical lattice, and thus an ideal received light waveform as disclosed in Japanese Unexamined Patent Publication No. 2000-241115 becomes difficult to obtain. Thus, the received light signal at the light receiving element includes various optical noises, reading of the absolute position information becomes difficult only from the received light signal of the light passed through the absolute position pattern and the precision optical lattice, and sufficient measurement accuracy cannot be ensured.

SUMMARY OF THE INVENTION

The present invention has been devised to solve the problems described above, and an object thereof is to provide a contact displacement meter capable of performing an accurate displacement measurement even in a case where the movement speed of the contact is fast and having high resistance property to optical noise.

In order to achieve the above object, according to a first invention, a contact displacement meter has a housing and a contact attached to the housing to be movable in one direction, and measures a displacement of the contact. The contact displacement meter includes: a light emitting element; a line sensor in which light receiving elements for receiving light emitted from the light emitting element are arrayed at a first array pitch; and a movement scale which is arranged on an optical path from the light emitting element to the line sensor, has reference light passing regions arrayed in a line in the one direction, a light shielding portion adjacent to the reference light passing regions, and a lattice region in which light passing regions and light shielding regions at substantially equal intervals are alternately arrayed at a second array pitch different from the first array pitch in the one direction between the reference light passing regions, and moves in the one direction together with the contact, the reference light passing regions being away from each other by a distance of a unique value in the movement scale; a detector for detecting a peak position of the reference light passing region at which a received light signal of light passed through the reference light passing region takes a local maxim; a first specifier for specifying an absolute position of the reference light passing region based on a distance between the adjacent peak positions detected by the detector; a second specifier for specifying a relative position of the reference light passing region with respect to the line sensor based on a received light signal of light passed through the lattice region; and a displacement calculator for calculating the displacement of the contact based on the absolute position specified by the first specifier and the relative position specified by the second specifier.

In the first invention, the adjacent reference light passing regions are away from each other by the distance of a unique value in the movement scale. The distance between the reference light passing regions is detected as a distance between the peak positions of the received light signal corresponding to the start bit or the received light signal of the light passed through the reference light passing region to specify an absolute position of the reference light passing region. The received light signal corresponding to the start bit is a steep pulse signal having one peak value, and thus the position of local maxim can be easily detected, and can be detected without being influenced by external noise. Therefore, the absolute position of the detected start bit can be specified by accurately detecting the distance between the start bits, and the absolute position can be reliably read even in a case where the contact is moved at fast speed.

The "peak position" is the absolute position of the reference light passing region at where the received light signal corresponding to the start bit becomes a local maxim or a coordinate value that is uniquely convertible with the absolute position of the reference light passing region, and "uniquely" means that there is only one value and there exists no other identical value.

According to a second invention, in the contact displacement meter of the first invention, a relationship between the second array pitch of the lattice region and the first array pitch of the light receiving elements is set such that one of the two continuous light receiving elements constantly receives at least part of light passing through the light passing region, and the second specifier includes: a phase detector for detecting a phase signal having the entire lattice region arrayed at the second array pitch as one cycle based on the received light signal of the light passed through the lattice region; and a calculator for calculating the relative position of the reference light passing region with respect to the line sensor based on the phase signal of the adjacent lattice region detected by the phase detector.

In the second invention, the phase signal having the entire lattice region arrayed at the second array pitch as one cycle is obtained based on the received light signal of the light passed through the lattice region, and the relative position of the reference light passing region with respect to the line sensor is calculated. In other words, through the use of two scales having different pitches, a more detailed relative position can be accurately specified in addition to the absolute position defined based on the distance between the peak positions of the received light signal corresponding to the start bit.

According to a third invention, in the contact displacement meter of the second invention, the phase detector extracts a waveform of an envelope curve of greater than or equal to at least half a cycle contained in the received light signal, and obtains the phase signal of the light passed through the lattice region based on the waveform of the envelope curve.

In the third invention, the phase signal is obtained by performing discrete Fourier transformation in the zone of the extracted waveform, for example, based on the waveform of the envelope curve of greater than or equal to at least half a cycle contained in the received light signal, and the relative position can be reliably obtained using the portion of small noise even in a case where noise is contained.

According to a fourth invention, in the contact displacement meter of the first invention, a fixed scale in which light passing regions and light shielding regions are alternately arrayed at substantially equal intervals in the one direction is arranged on an optical path from the movement scale to the line sensor.

In the fourth invention, the fixed scale in which the light passing regions and the light shielding regions are alternately arrayed at substantially equal intervals is arranged in addition to the movement scale, and thus a state similar to masking the light receiving element is obtained, the phases of the received light signals of the adjacent light receiving elements may be differed (inverted by substantially 180 degrees), and the phases of the received light signals of every other light receiving elements may be made the same to reliably perform the carry correction.

According to a fifth invention, in the contact displacement meter of the first invention, the light receiving elements are arrayed and spaced apart from each other in the line sensor.

In the fifth invention, the light receiving elements configuring the line sensor are arrayed and are spaced apart from each other, thereby forming a periodic light receiving dead band in the line sensor. Therefore, similar to the fourth invention, a state similar to masking the light receiving element is obtained, the phases of the received light signals of the adjacent light receiving elements may be differed (inverted by substantially 180 degrees), and the phases of the received light signals of every other light receiving elements may be made the same to reliably perform the carry correction.

According to the above-described configuration, the received light signal corresponding to the start bit is a steep pulse signal having one peak value, and thus the local maxim point can be easily detected, and can be detected without being influenced by external noise. Therefore, the absolute position of the detected start bit can be specified by accurately detecting the distance between the start bits, and the absolute position can be reliably read even in a case where the contact is moved at fast speed.

BRIEF DESCRIPTION OF THE DRAWINGS

FIGS. 13A to 13F are schematic views each showing the positional relationship of the line sensor and the movement scale, the received light amount of each light receiving element, and the phase signal.

DETAILED DESCRIPTION OF THE PREFERRED EMBODIMENTS

Embodiments of the present invention will be described in detail below with reference to the drawings. Same or similar symbols are denoted for elements having the same or similar configurations or functions throughout the drawings referenced in the description of each of the embodiments, and detailed description thereof will not be repeated.

First Embodiment

Figure 1:
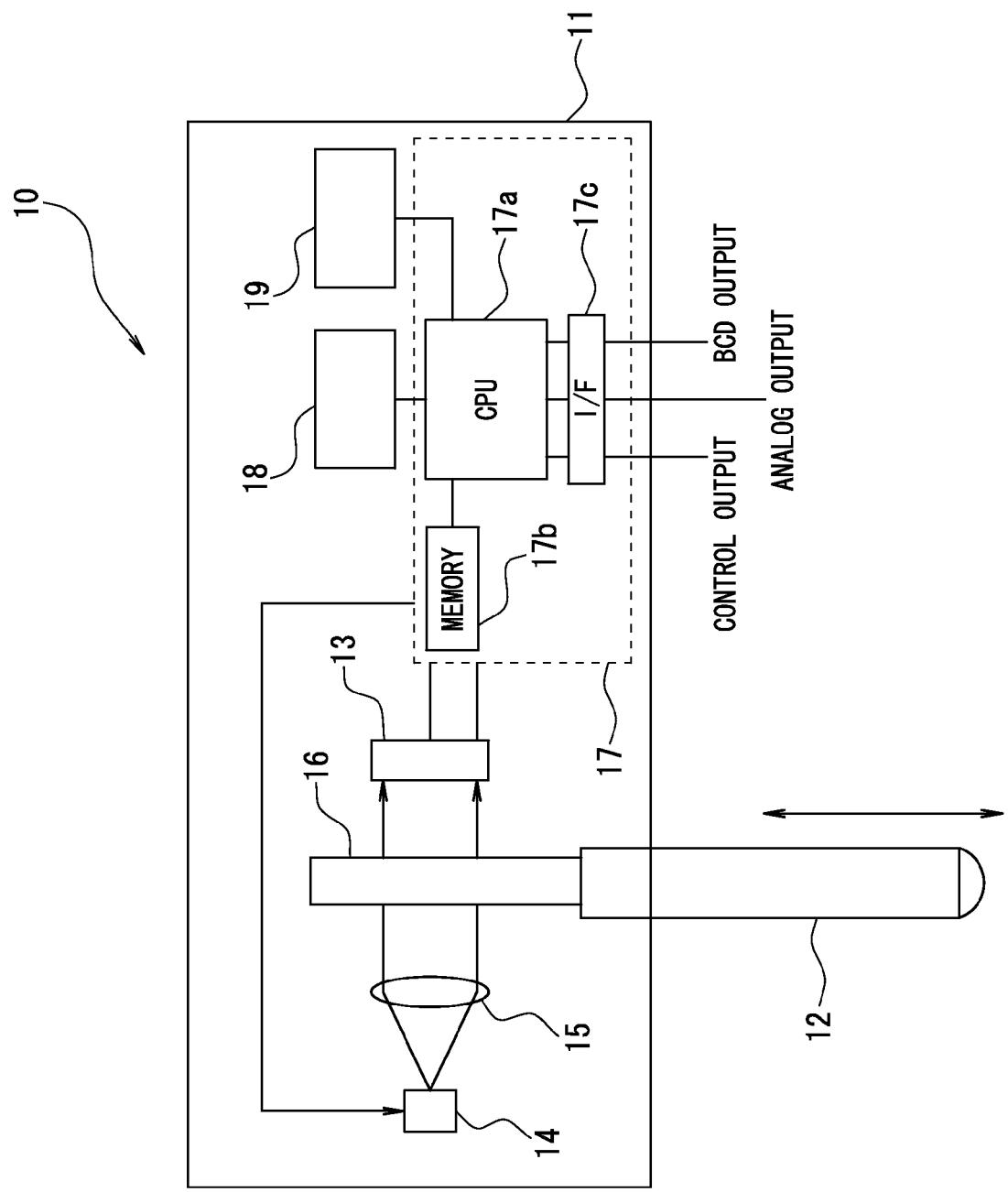
FIG. 1 is a block diagram showing a configuration of a contact displacement meter according to First Embodiment of the present invention.

FIG. 1 is a block diagram showing a configuration of a contact displacement meter according to First Embodiment of the present invention. A contact displacement meter 10 according to First Embodiment includes a contact 12 movable in a predetermined direction inside a housing 11. The housing 11 has a substantially rectangular solid shape, which size is length×width×height of about 60 mm×30 mm×15 mm, and the relative displacement of the contact 12 in the length direction with respect to the housing 11 is measured.

The contact 12 is attached to the housing 11 so as to be linearly movable in a predetermined direction by way of a ball bearing, and the like. An elastic body such as a spring (not shown) for biasing the contact 12 in a projecting direction is arranged between the contact 12 and the housing 11. A light emitting element 14 is a light source such as an LED and an LD, where the light emitted from the light emitting element 14 is converted to a substantially parallel light by being passed through a collimator lens 15, and then irradiated on a line sensor 13. An optical mechanism including the light emitting element 14 and the collimator lens 15 is not limited to such a configuration, and may be of any configuration as long as it is a mechanism capable of guiding a wide-width parallel light to the line sensor 13.

For instance, instead of generating a wide-width parallel light only with the collimator lens 15 of large aperture and long focal length, a parallel light of small diameter may be generated with a collimator lens having a small aperture and a short focal length and the generated parallel light may be entered diagonally to one plane of a prism to thereby generate a parallel light of wide width only in a predetermined direction. The plane of the prism from which the parallel light exits is formed to be substantially orthogonal to the exit parallel light. The wide-width parallel light preferably has a uniform light intensity distribution, and to this end, a light shielding member (not shown) may be arranged between the light emitting element 14 and the collimator lens 15, so that only the light of a range in which the light intensity distribution is assumed to be uniform of the light emitted from the light emitting element 14 may be light passed and the other light may be light shielded.

The line sensor 13 is an image sensor in which the light receiving elements such as a CMOS and a CCD are arrayed at a predetermined interval. The plurality of light receiving elements configuring the line sensor 13 are arrayed along the wide-width direction of the wide-width parallel light. A predetermined pattern formed by the passing/shielding of the light is formed on a movement scale 16. The movement scale 16 is connected to the contact 12, and the predetermined pattern is arrayed along the direction the contact 12 can be moved.

The predetermined pattern of the movement scale 16 is arranged along the wide-width direction of the wide-width parallel light, where part of the predetermined pattern is arranged on an optical path formed by the wide-width parallel light. That is, the movement scale 16 is arranged movable along the wide-width direction of the parallel light between the optical mechanism for generating the wide-width parallel light and the line sensor 13. The line sensor 13 may be closely adhered and attached to an extent of not contacting the movement scale 16, or may be arranged on a Fourier image plane, as hereinafter described.

The contact displacement meter according to First Embodiment reads out a stop position of the contact 12 using the movement scale 16, and measures the relative displacement from a reference position. That is, in measuring the relative displacement, a state in which the contact 12 is pulled out to a maximum length from the housing 11 is set as a reference position, the contact 12 is contacted to the measuring object with the contact 12 at the reference position, and then pushed in to obtain the relative displacement of the contact 12.

A control circuit 17 includes a CPU 17a, a memory 17b, an input/output interface 17c, and the like, which are connected to each other by an internal bus. The control circuit 17 is also connected to the light emitting element 14, an operation unit 18, and a display unit 19. The CPU 17a acquires a measurement value for every constant sampling interval, executes an appropriate correction based on various information stored in the memory 17b, and displays the corrected measurement value on the display unit 19. The input/output interface 17c is an external input/output port capable of outputting a control output, analog output, BCD output, and the like.

In the contact displacement meter according to First Embodiment of the present invention, the position of a start bit is specified based on a pulse waveform (hereinafter referred to as a monopulse waveform) indicating the start bit, and the relative displacement is measured along with the read value of a vernier. FIGS. 2A to 2E are schematic views each showing a positional relationship between the position of the start bit and the light receiving element of the line sensor 13. In FIGS. 2A to 2E, the vernier is not denoted for the sake of simplifying the description, and a case of one start bit will be described.

Figure 2A:
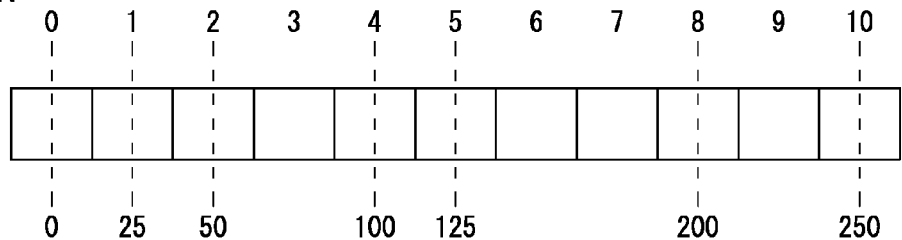
FIGS. 2A to 2E are schematic views each showing a positional relationship of the position of a start bit and a light receiving element of a line sensor.
Figure 2B:
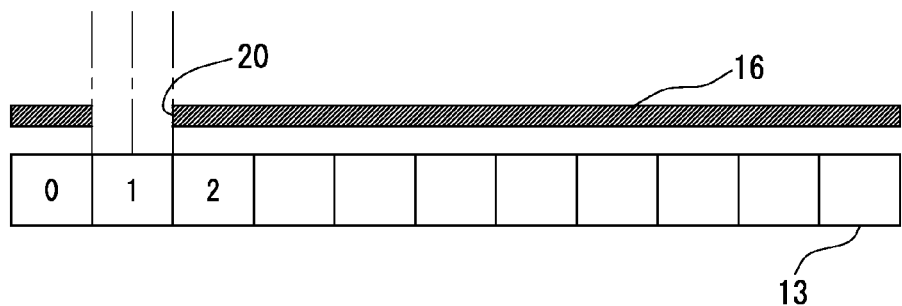
Figure 2C:
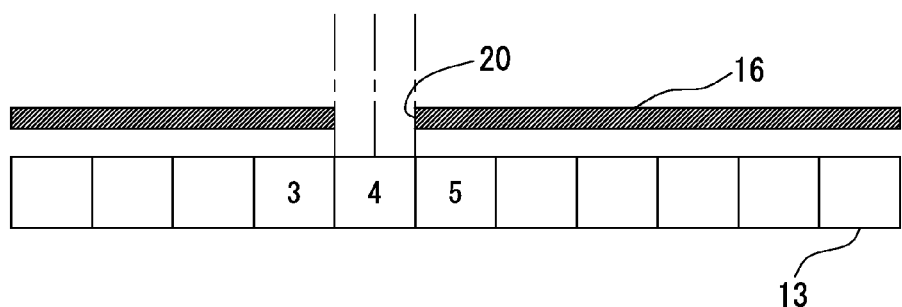

As shown in FIG. 2A, the line sensor 13 has the light receiving elements arrayed from numbers 0 to 10 at an array pitch p1. As shown in FIG. 2B, if a reference light passing region 20 of the movement scale 16 is positioned at the first of the light receiving elements, 25.0 μm is output as the measurement value if the array pitch p1 is 25.0 μm. As shown in FIG. 2C, if the reference light passing region 20 of the movement scale 16 is positioned at the fourth of the light receiving elements, 4×25.0+0.0=100.0 μm is output as the measurement value if the array pitch p1 is 25.0 μm and the read value of the vernier is 0.0 μm.

Figure 2D:
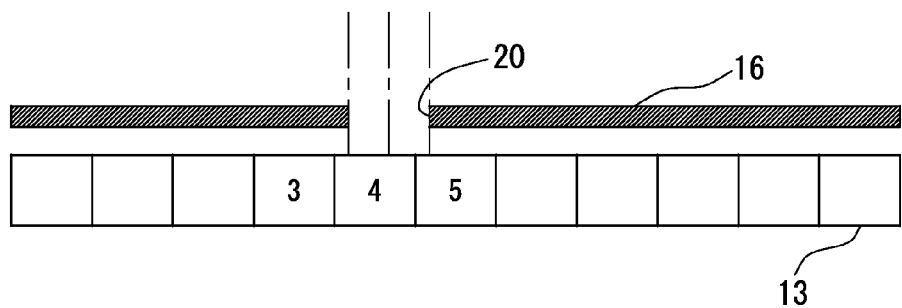

In FIG. 2D, since the position of the start bit is at the fourth of the light receiving elements, when the read value of the vernier is 6.0 μm, the measurement value of 106.0 μm is output by adding 6.0 μm to the displacement amount 100.0 μm corresponding to the fourth of the light receiving elements.

Figure 2E:
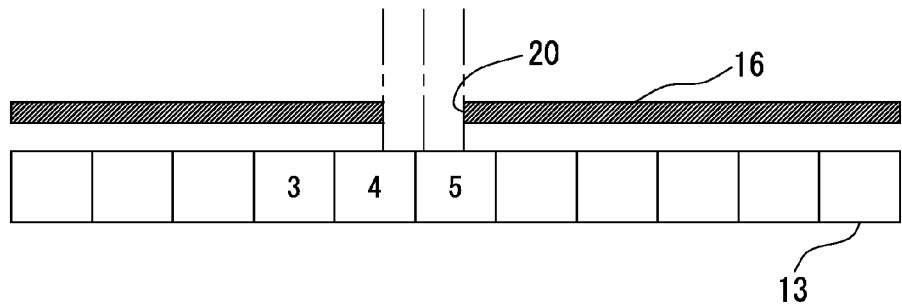

As shown in FIG. 2E, if the start bit is positioned between the fourth and the fifth of the light receiving elements of the line sensor 13, the judgment on which light receiving element the start bit is positioned does not match the judgment result by method of interpolation, presence of electrical noise, non-uniformity in sensitivity of the light receiving element, and the like. For instance, when judged that the position of the start bit is positioned at the fourth of the light receiving elements, and the read value of the vernier is −12.3 μm, the measurement value of 87.7 μm is output by adding −12.3 μm to the displacement amount 100 μm corresponding to the fourth of the light receiving elements. When judged that the position of the start bit is positioned at the fifth of the light receiving elements, the measurement value of 112.7 μm is output by adding −12.3 μm to the displacement amount 125 μm corresponding to the fifth of the light receiving elements. Therefore, the measurement value varies by one array pitch.

Figure 3:
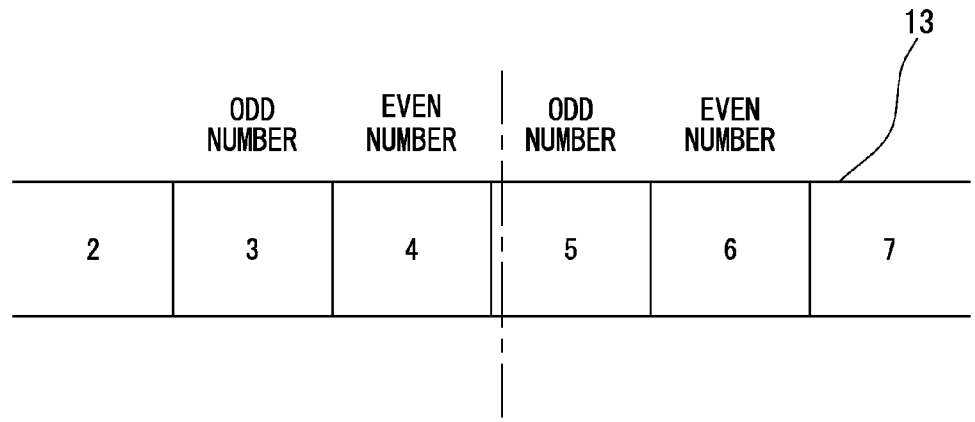
FIG. 3 is an explanatory view of the principle of vernier rereading using odd-numbered light receiving elements and even-numbered light receiving elements.

In First Embodiment, correction is made using both the odd-numbered light receiving elements and the even-numbered light receiving elements. FIG. 3 is an explanatory view of the principle of vernier rereading using the odd-numbered light receiving elements and the even-numbered light receiving elements.

In FIG. 3, the array pitch p1 of the light receiving element is 25.0 μm, and a sub-pixel interpolation is executed. If the reference light passing region 20 of the movement scale 16 is positioned at the fourth of the light receiving elements, 4×25.0=100.0 μm is output as the measurement value since the array pitch p1 is 25.0 μm.

If determined that the start bit is positioned on the even-numbered light receiving element (fourth of the light receiving elements herein) side, the value that may be taken for the measurement value is between 100 μm and 112.5 μm. Therefore, the read value of the vernier is in the range of between 0 μm and 12.5 μm.

If the read value of the vernier is around −12.5 μm in this case, the start bit can be estimated as originally being positioned at the fifth of the light receiving elements. Therefore, the read value of the vernier is reread as below instead of from −12.5 μm to 12.5 μm.

If determined that the start bit is positioned on the even-numbered light receiving element side, −12.5 μm to −11.25 μm is reread as 12.5 μm to 13.75 μm, and the correction of −11.25 μm to 13.75 μm is executed. If determined that the start bit is positioned on the odd-numbered light receiving element side, 11.25 μm to −12.5 μm is reread as −13.75 μm to −12.5 μm, and the correction of −13.75 μm to 11.25 μm is executed.

Through the rereading of the read value of the vernier by shifting by a pitch (½0 pitch in First Embodiment) shorter than the array pitch, carry is avoided from occurring in the vicinity of the boundary of the light receiving elements, and variation in the measurement value for one pitch can be prevented in advance.

Figure 4:
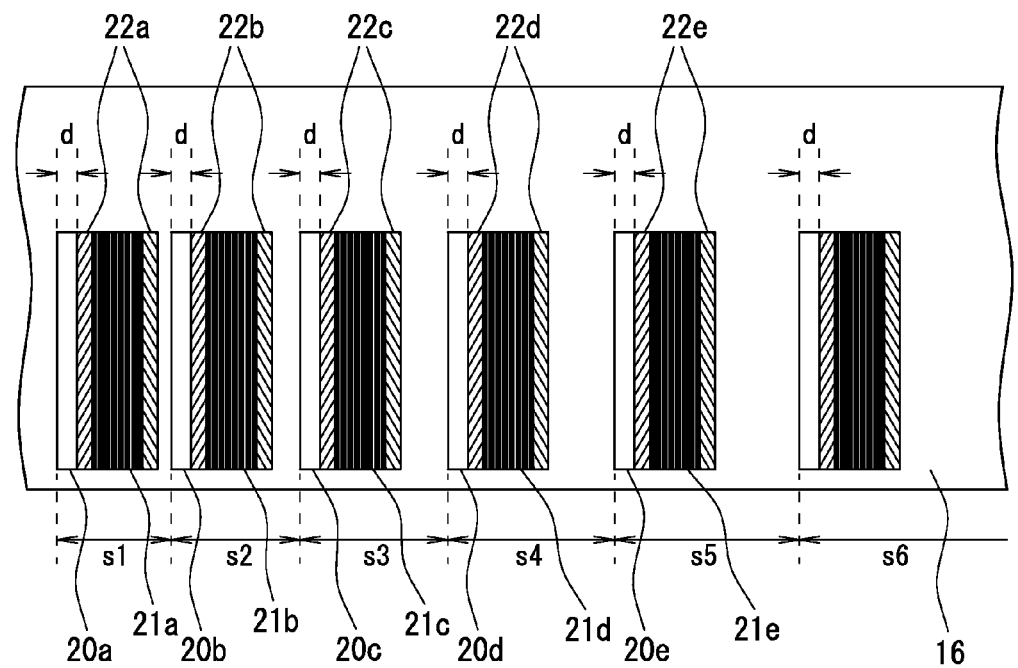
FIG. 4 is an illustrative view of an array of reference light passing regions of the movement scale of the contact displacement meter according to First Embodiment of the present invention.

FIG. 4 is an illustrative view of the array of the reference light passing regions 20 of the movement scale 16 of the contact displacement meter 10 according to First Embodiment of the present invention. In the movement scale 16, the slit-shaped reference light passing regions 20, 20, . . . having substantially the same width d for selectively passing the light emitted from the light emitting element 14 are arrayed in one line in the movement direction of the contact 12. Predetermined light shielding regions are arranged on both sides of the reference light passing region 20, and a lattice region 21, 21, . . . in which the light passing regions and the light shielding regions of the same shape and the same size are arrayed at equal array pitches is arranged between the reference light passing regions 20, 20, the lattice region 21, 21, . . . having the light shielding regions 22, 22, . . . on both ends. In FIG. 4, the lattice region 21 is denoted as 21a to 21e from the left end, and the light shielding regions 22 are denoted as 22a to 22e from the left end. In the movement scale 16, the portions other than the reference light passing region 20 and the light passing region of the lattice region 21 are the light shielding regions.

The relationship between the array pitch p1 of the light receiving elements configuring the line sensor 13 and the array pitch p2 of the light passing regions and the light shielding regions in the lattice region 21 is in a relation of a so-called "main scale" and "vernier" of a vernier caliper. That is, the lattice region 21 is arranged between the reference light passing regions 20, 20 to realize the resolution of smaller than or equal to the array pitch p1 of the light receiving elements.

Each reference light passing region 20 is arrayed so that the distance with the adjacent reference light passing region 20 has a unique value with respect to each other in the movement scale 16. For instance, assuming the reference light passing regions 20 in FIG. 4 are denoted as 20a to 20e from the left end, the distances s between the adjacent reference light passing regions all have a unique value of s1 to s6. The width d of each reference light passing region 20 is sufficiently large with respect to the wavelength of the light emitted from the light emitting element 14, so that interference and the like do not occur between the adjacent reference light passing regions 20, 20.

Figure 5:
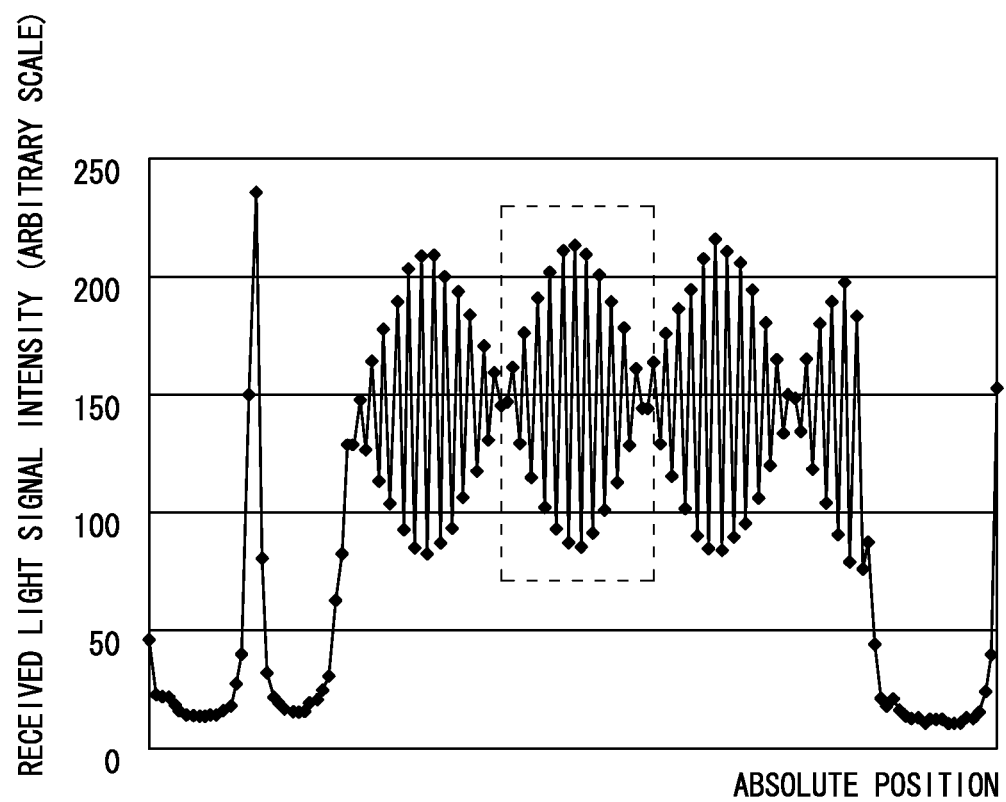
FIG. 5 is an illustrative view of a received light signal in the line sensor of the light passed through one reference light passing region and the light passing region of the lattice region.

FIG. 5 is an illustrative view of a received light signal in the line sensor 13 of the light passed through one reference light passing region 20 and the light passing region of the lattice region 21. As shown in FIG. 5, the received light signal is first detected with a monopulse waveform having a single peak value, and then the waveform which signal value drastically fluctuates is detected. The waveform which signal value drastically fluctuates is obtained because, when parallel light is irradiated on the lattice region 21 in which the light passing regions and the light shielding regions are alternately arrayed at a predetermined array pitch, the parallel light passed through the lattice region 21 generates strong and weak light intensity distribution (correlation degree with the pattern formed on the lattice region 21) corresponding to the distance from the lattice region 21 due to the influence of diffraction.

At the position that is called as the Fourier image plane and is away from the lattice region 21 by a predetermined distance, there is formed a light image corresponding to the pattern formed on the lattice region 21 having a large light intensity amplitude. The Fourier image plane is formed at a distance expressed as $$R = n\frac{d^2}{\lambda} \ (n = 1, 2, \ldots)$$

where R is the distance from the lattice region 21, d is the pitch between the adjacent light passing regions, and λ is the wavelength of the parallel light. The line sensor 13 is arranged in correspondence to the position to be formed with the Fourier image plane with respect to the lattice region 21 formed on the movement scale 16.

Figure 6:
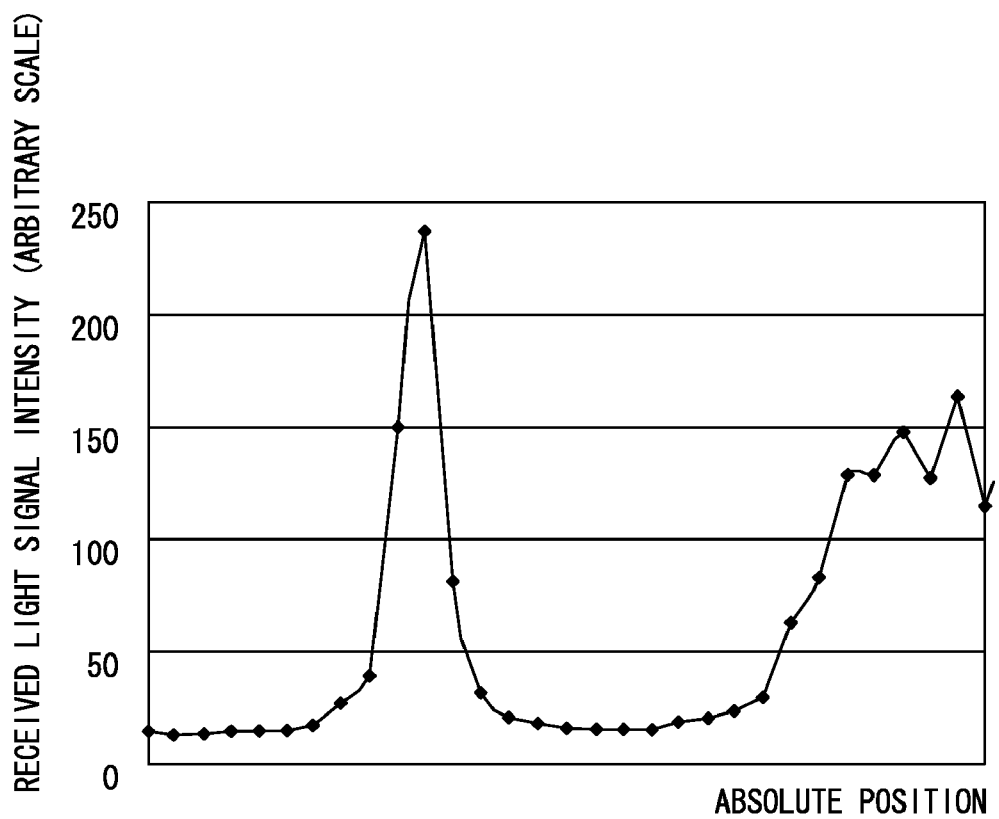
FIG. 6 is a waveform chart in which the vicinity of the monopulse waveform corresponding to the start bit is enlarged.

FIG. 6 is a waveform chart in which the vicinity of the monopulse waveform corresponding to the start bit is enlarged. As shown in FIG. 6, the monopulse waveform is the received light signal of the light passed through the reference light passing region 20, and the waveform in which the received light signal drastically fluctuates on the inner side of the envelope curve following the monopulse waveform is the received light signal of the light passed through the light passing region of the lattice region 21. The width of the reference light passing region 20 is set such that the monopulse waveform is formed with sufficient width and light intensity, where the monopulse waveform is for seven or eight light receiving elements, and the light intensity is the intensity of the same extent as the waveform corresponding to the lattice region 21 with reference to FIG. 6.

The received light signal corresponding to the lattice region 21 does not steeply fall by the influence of diffraction etc., and gradually reduces over about seven or eight light receiving elements. Thus, a predetermined light shielding margin is set between the reference light passing region 20 and the adjacent lattice region 21 so that the monopulse waveform does not interfere with the corresponding waveform of the adjacent lattice region 21. Thus, the monopulse waveform can be easily captured, and is strong to optical noise, and thus the existence of the start bit can be reliably detected.

The misrecognition of the monopulse waveform due to electrical noise can be prevented by providing a sufficient width to the monopulse waveform. For instance, of the patterns of weak, strong, weak, strong, weak of the received light waveform resulting from the alternate existence of the light passing regions and the light shielding regions in the lattice region 21, the pattern of weak, middle, strong, middle, weak is recognized if electrical noise is superimposed on the "weak" received light waveform at the middle, and may be mistakenly recognized as the monopulse waveform over three light receiving elements. Thus, misrecognition of the monopulse waveform by electrical noise can be prevented in advance by performing a setting so as to extract the waveform over of five or more light receiving elements as the monopulse waveform.

The position indicating the local maxim of the received light signal of the light passed through the reference light passing region 20 is detected as a peak position to serve as the basis of calculation of the distance between the reference light passing regions 20, 20. The peak position may be detected by specifying the light receiving element, which received light amount becomes a local maxim, from the waveform recognized as the monopulse waveform, and detecting the position of the specified light receiving element as the peak position, or the peak value may be detected by selecting a predetermined number of light receiving elements from the waveform recognized as the monopulse waveform, reproducing the peak waveform through interpolation by a predetermined function such as quadratic interpolation using the received light amount of the selected light receiving element, and calculating the position at where a luminance value becomes a local maxim in the reproduced waveform in units of sub-pixels.

Returning to FIG. 5, as shown with a broken line, the envelope curve of the received light signal for about half a cycle or about one cycle at the center of the received light signal (hereinafter referred to as vernier waveform) of the light passed through the light passing region of the lattice region 21 is extracted, and the phase signal is obtained by performing discrete Fourier transformation. That is, the phases of the received light signal of the adjacent light receiving elements, for example, the vernier waveform (received light signal) of the light receiving element positioned on the odd-number and the vernier waveform (received light signal) of the light receiving element positioned on the even-number are inverted about 180 degrees, and the received light signal of every other light receiving element, for example, the received light signals of the light receiving elements positioned on the odd-number or the received light signals of the light receiving elements positioned on the even-number are in the same phase. In other words, the envelope curve of the vernier waveform can be extracted by connecting the pixel values of the light receiving elements positioned on the odd-numbers, or connecting the pixel values of the light receiving elements positioned on the even-numbers.

The vernier waveform has a periodic shape more aligned at the center of the lattice region 21, and the periodic shape is slightly distorted at both ends of the lattice region 21. Therefore, in the vernier waveform, the relationship between the array pitch p2 in the lattice region 21 and the array pitch p1 of the light receiving elements and the length in the array direction of the lattice region 21 (number of pattern arrays of the lattice region 21) are preferably adjusted so that at least three intersections of the envelope curve of the received light signal at the odd-numbered light receiving element and the envelope curve of the received light signal at the even-numbered light receiving element counted from the received light signal of the light passed through the reference light passing region 20 in the light receiving direction of the movement scale 16 are obtained, and the phase signal is detected based on the received light signal for about half a cycle or about one cycle corresponding to the center of the lattice region 21.

Figure 7:
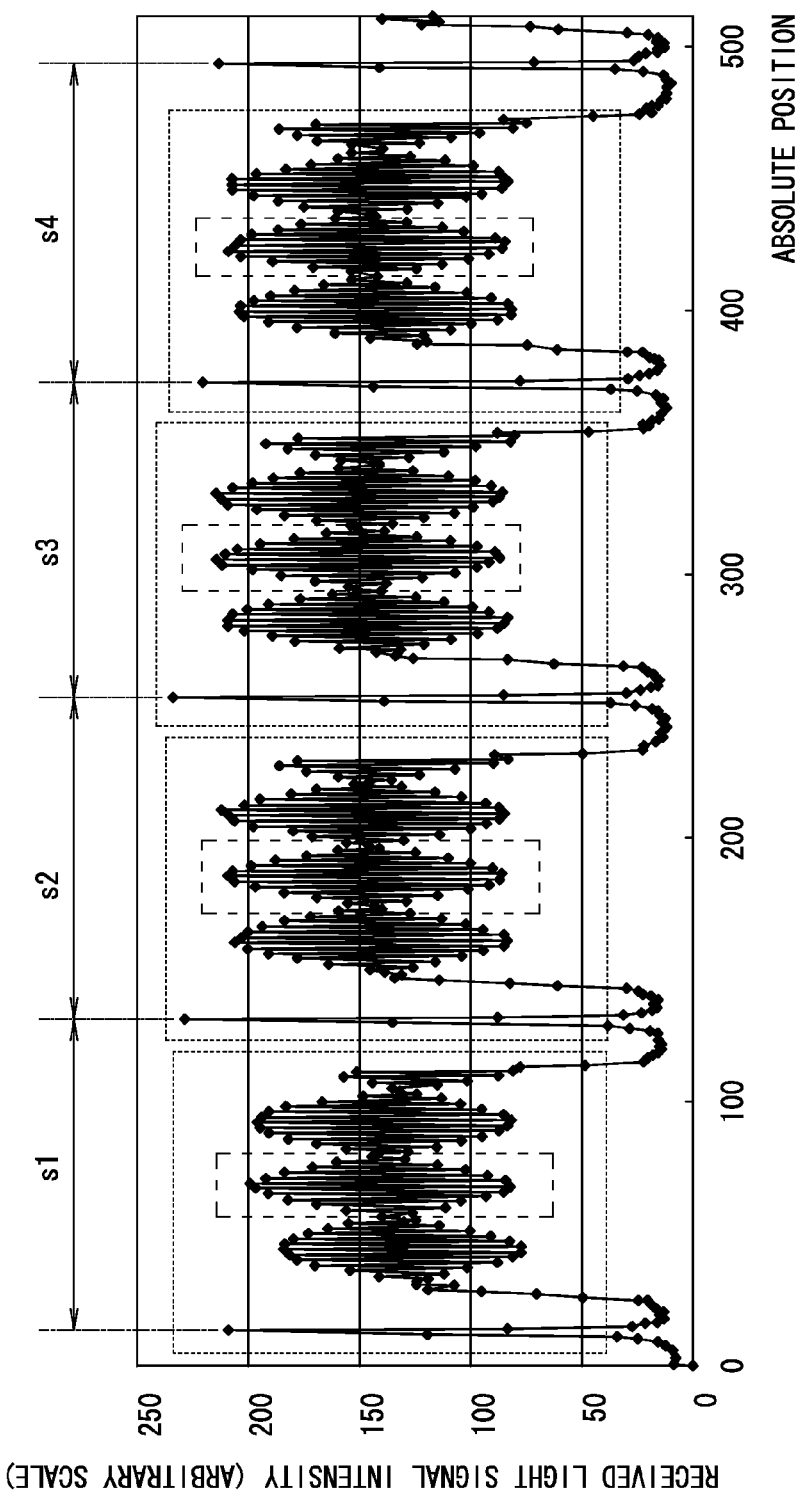
FIG. 7 is a graph illustrating the received light signal read by the line sensor.

FIG. 7 is a graph illustrating the received light signal read by the line sensor 13. FIG. 7 shows the received light signals corresponding to five reference light passing regions 20, 20, . . . , and the received light signals corresponding to four lattice regions 21, 21, . . . , and shows four sets of data including the monopulse waveform corresponding to the start bit and the vernier waveform. In First Embodiment, the pattern length of the movement scale 16 and the length of the light receiving element column (number of light receiving elements) are set such that at least three sets of the set of the monopulse waveform corresponding to the start bit (reference light passing region 20) and the corresponding vernier waveform (received light signal corresponding to the lattice region 21) are obtained regardless of the relative displacement of the movement scale 16 and the line sensor 13. The setting is such that four sets of the set of the monopulse waveform and the corresponding vernier waveform as shown in FIG. 7 are obtained only when the relative displacement of the movement scale 16 and the line sensor 13 is in a predetermined state.

In the state where four sets of the set of the monopulse waveform and the vernier waveform are obtained, four peak positions on the line sensor 13 corresponding to each start bit are obtained and four corresponding vernier waveforms can be obtained, and thus the peak position is corrected based on the phase of the corresponding vernier waveform, and four peak positions can be determined in units of sub-pixels. Thus, compared to when three peak positions are recognized in units of sub-pixels, correction by calibration can be carried out based on the light receiving element of a wider range along the arraying direction of the light receiving elements of the line sensor 13, whereby the measurement accuracy enhances.

In First Embodiment, the setting is such that the number of sets of the monopulse waveform and the vernier waveform is normally three sets and four sets are obtained only when the relative displacement is at a predetermined state, but the number of sets is not particularly limited, and the pattern length of the movement scale 16 and the length of the light receiving element column (number of light receiving elements) may be set such that the number of sets is one greater than the normal number of sets only when the relative displacement of the movement scale 16 and the line sensor 13 is at a predetermined state.

The distances s1 to s4 between the adjacent start bits in FIG. 7 is a unique value, and is corresponded to the absolute position of the reference light passing regions 20, 20, . . . . In First Embodiment, the distance between the adjacent start bits is changed in units of the array pitch between the light receiving elements, a predetermined number of light receiving elements is selected from the waveform recognized as the start bit (monopulse waveform), and interpolation is performed by a predetermined function such as quadratic interpolation using the received light amount of the selected light receiving element to reproduce the monopulse waveform indicating the start bit without using the vernier waveform corresponding to each start bit. The position at where the received light amount of the reproduced monopulse waveform becomes a local maxim is calculated in units of sub-pixels, and the unique start bit can be specified from the distance between the adjacent start bits.

In First Embodiment, the array pitch p1 of the light receiving element of the line sensor 13 is 25.0 μm, and thus the distance between the adjacent start bits has the unique value set at an interval of 25.0 μm. Furthermore, one of the start bits can be restored based on the distance between other adjacent start bits even in a case where it cannot be correctly obtained due to electrical noise, and the like by setting the pattern length of the movement scale 16 and the length of the light receiving element column (number of light receiving elements) so that at least four start bits can be obtained.

In the example of FIG. 7, if the start bit at the most left end cannot be correctly obtained, the position of the start bit at the most left end can be restored since s2 and s3 can be obtained, and similarly, if the start bit second from the left cannot be correctly obtained, the position of the start bit second from the left can be restored since s3 can be obtained. As problems do not arise even in a case where the fourth vernier waveform is incomplete, it should be apparent that the state of being set such that the number of sets of the monopulse waveform equivalent to the start bit and the vernier waveform corresponding thereto is normally three sets and four sets are obtained only when the relative displacement is at a predetermined state, and the state where at least four start bits can be obtained are both satisfied.

The absolute position of each reference light passing region 20 is the distance to each reference light passing region 20 with the 0th (reference light passing region positioned at the most end of the pattern formed on the movement scale 16, reference light passing region 20 at the end in the left direction in the example of FIG. 7) reference light passing region 20 as the reference. In First Embodiment, the received light waveform shown in FIG. 7 shifts to the right side as the contact 12 is pushed in. Therefore, the 0th to the fourth start bit are projected on the line sensor 13 with the contact 12 pushed in the most, and the sixth to the eighth start bits are projected on the line sensor 13 with the contact 12 pulled out the most.

For instance, 18.000 mm, 15.075 mm, 12.000 mm, 9.050 mm, 6.000 mm, 3.025 mm, 0.000 mm, . . . in order from the 0th, and the distance between the adjacent start bits is set such that 2.925 mm (equivalent to 117 pixels, 3.075 mm (equivalent to 123 pixels), 2.950 mm (equivalent to 118 pixels), 3.050 mm (equivalent to 122 pixels), 8.975 mm (equivalent to 119 pixels), 3.025 mm (equivalent to 121 pixels, . . . assuming one pixel per one light receiving element. In FIG. 7, an example in which the second to the sixth start bits are projected on the line sensor 13 is shown, but Nth to (N+3)th or Nth to (N+4)th start bits may be projected on the line sensor 13 according to the relative displacement of the movement scale 16 and the line sensor 13.

The distance from each start bit (reference light passing region 20) to the vernier waveform (lattice region 21) to be extracted is defined in advance, and takes a constant value regardless of the start bit (reference light passing region 20) in First Embodiment. Specifically, the phase signal is obtained by extracting 40th (1.000 mm) to 88th (2.200 mm) light receiving elements from the light receiving elements corresponding to the peak position of the start bit. Even in a case where one of the start bits cannot be correctly read due to electrical noise, the position of the start bit (peak position) that cannot be read can be restored in units of light receiving elements (units of pixels) from the other start bits that were correctly read, where the extraction of the vernier waveform of the set where one of the start bits cannot be correctly read due to electrical noise is executed based on the restored position of the start bit.

The phase signal is obtained from the extracted vernier waveform, and the peak position on the line sensor 13 of the start bit (reference light passing region 20) is determined in units of sub-pixels based on the obtained phase signal. Thus, the relative position from the light receiving element that becomes the reference on the line sensor 13 becomes apparent. Both the absolute position of the reference light passing region 20 and the relative position from the light receiving element that becomes the reference on the line sensor 13 can be calculated, which may be added to measure the displacement.

In First Embodiment, at least three sets of the monopulse waveform and the vernier waveform can be extracted, but the displacement ultimately obtained in all sets, that is the displacement obtained by adding the absolute position of the reference light passing region 20 and the relative position from the light receiving element that becomes the reference on the line sensor 13 is substantially the same. Therefore, in First Embodiment, the contact displacement meter 10 outputs the displacement obtained based on each displacement obtained in each set such as a representative value that alleviates the electrical noise, optical variation, and the like of the average value, the median value, and the like of the displacement obtained in each set as the displacement.

FIGS. 8A to 8F is a schematic view showing the positional relationship of the line sensor 13 and the movement scale 16, the received light amount of each light receiving element, and the phase signal. In First Embodiment, the width of the reference light passing region 20 is adjusted to be the length of two light receiving elements. Thus, the received light waveform, that is, the monopulse waveform on the line sensor 13 corresponding to the reference light passing region 20 is projected over five or more light receiving elements, and the wave height value thereof is also substantially the same as the vernier waveform, which is the received light waveform corresponding to the lattice region 21. The length of one light passing region of the lattice region 21 is slightly shorter than the length of one light receiving element, and the pitch of the light passing region of the lattice region 21 is slightly shorter than the pitch between the odd-numbered light receiving elements or the even-numbered light receiving elements.

Figure 8A:
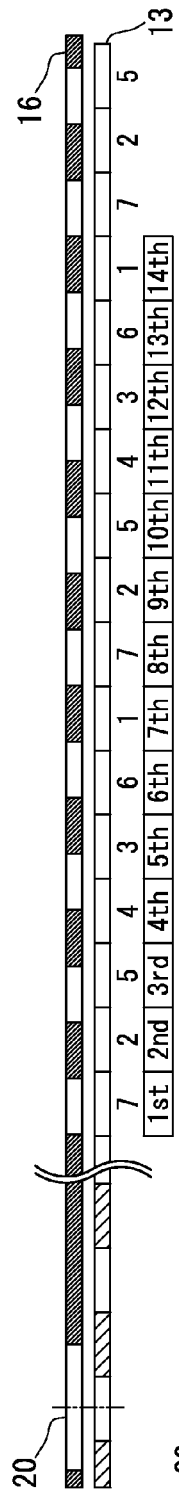
FIGS. 8A to 8F are schematic views each showing the positional relationship of the line sensor and the movement scale, the received light amount of each light receiving element, and the phase signal.
Figure 8B:
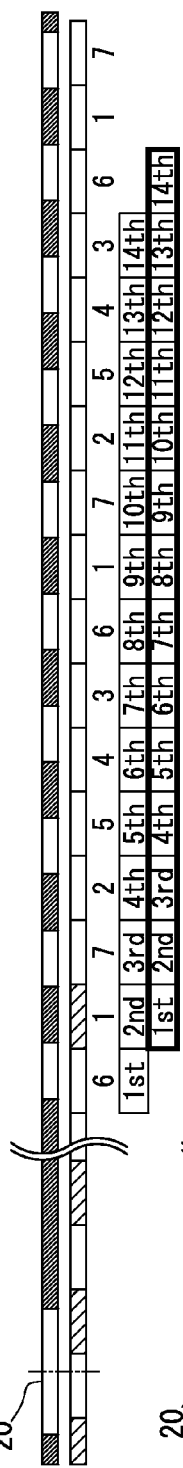
Figure 8C:
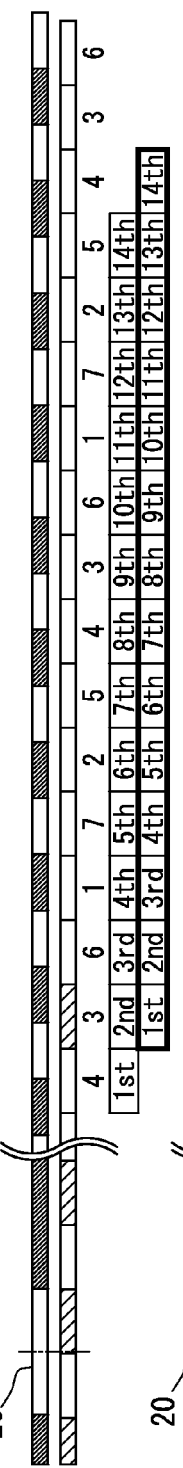

In FIGS. 8A to 8F, the received light amount of the received light signal received by each light receiving element is relatively shown in seven stages. In FIG. 8A, the center of the reference light passing region 20 matches the center of the light receiving element of the line sensor 13, and the movement scale 16 shifts to the right side with respect to the line sensor 13 from FIGS. 8B to 8F, where the state in which the center of the reference light passing region 20 exactly matches the boundary portion between the light receiving elements in the line sensor 13 is shown in FIG. 8C. In FIG. 8A, if the center of the reference light passing region 20 matches the center of the ninth light receiving element of the line sensor 13, the received light amount of the 49th to the 62nd light receiving elements of the line sensor 13, for example, are extracted as the vernier waveform.

Regarding each received light amount of the vernier waveform, the numerical values of 7, 5, 3, 1, 2, 4, 6, 7, . . . are periodically repeated in order from the 49th light receiving element focusing only on the odd-numbered light receiving elements when the array pitch p1 of the light receiving element is 25.0 μm. Focusing on when the received light amount is "1", the position that becomes "1" shifts to the right gradually from FIGS. 8A to 8F. Using this property, the phase is defined as 0, that is, the relative position correction value as 0.00 μm when the received light amount of the 55th light receiving element is "1", −18.75 μm when the received light amount of the 49th light receiving element is "1", and similarly, as −12.5 μm, −6.25 μm, 0.00 μm, 6.25 μm, 12.5 μm, 18.75 μm, . . . for the position of the 51st light receiving element, the position of the 53rd light receiving element, . . . etc. This example is merely schematically shown, and a finer relative position correction value can be obtained when obtaining the phase through the discrete Fourier transformation, and definition may be such that discontinuous points of the phase exist in the adjacent light receiving element as in "1" described above.

Figure 8D:
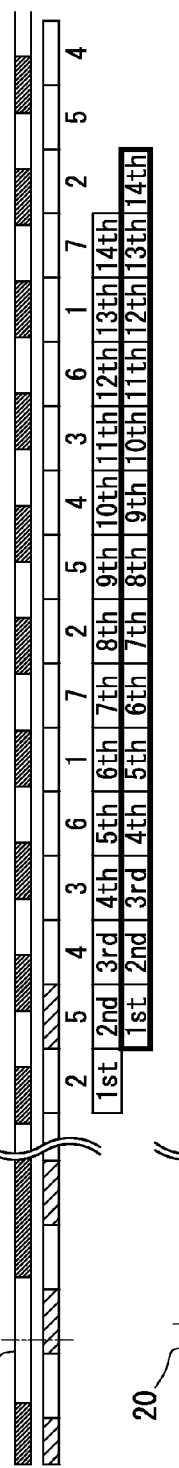
Figure 8E:
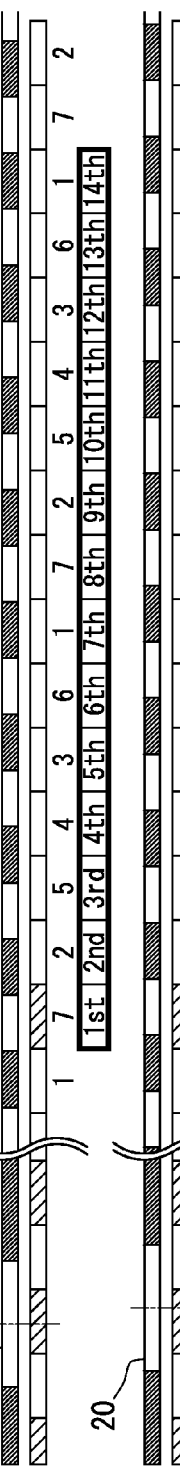
Figure 8F:
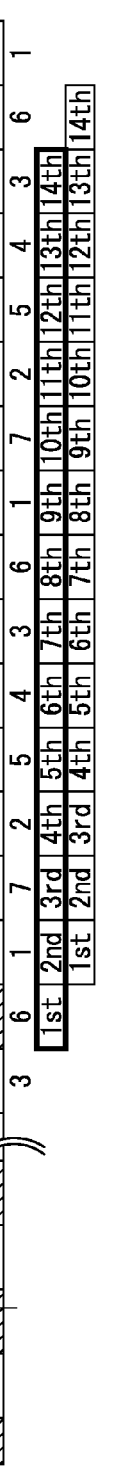

A case of FIGS. 8B to 8D in which the center of the reference light passing region 20 is between the ninth light receiving element and the tenth light receiving element will now be described. In this case, the center of the reference light passing region 20 (peak position of start bit) is determined only with the received light amount of the monopulse waveform, and thus the detection accuracy of the peak position of the start bit is not high, and a possibility of recognizing the peak position of the start bit as the ninth light receiving element and a possibility of recognizing as the tenth light receiving element exist. If recognized that the peak position of the start bit is the ninth light receiving element, the process same as the above is carried out, and the relative position correction value is calculated according to the light receiving element for receiving the received light amount of "1". If recognized that the peak position of the start bit is the tenth light receiving element, the received light amounts of the 50th to the 63rd light receiving elements are extracted as the vernier waveform if the process same as when recognized as the ninth light receiving element is performed, where discontinuous points of the phase exist and furthermore, the relative position correction value different from the actual value is calculated if the relative position correction value is calculated according to the light receiving element for receiving the received light amount of "1".

If recognized that the peak position of the start bit is the tenth light receiving element, the received light amount of "7" is focused on instead of the received light amount of "1". In this case, similar to when focusing on the received light amount "1", the position of the 51st light receiving element, the position of the 53rd light receiving element, . . . are defined to indicate −18.75 μm, −12.5 μm, −6.25 μm, 0.00 μm, 6.25 μm, 12.5 μm, 18.75 μm, . . . as the relative position correction value. When focusing only on the 50th to the 63rd even-numbered light receiving elements, the relative position correction value can be defined as above by focusing on the received light amount of "1".

If the array pitch p1 of the light receiving element is 25 μm, the relative position correction value can be expressed as from −12.5 μm to 12.5 μm, but the relative position correction value can be set so as to include part of the adjacent light receiving elements as described above. Thus, in the case of FIG. 8C, the relative position becomes ninth×25.0 μm/–light receiving element+relative position correction value=231.25 μm if recognized that the peak position of the start bit is the ninth light receiving element, and the relative position becomes tenth×25.0 μm/–light receiving element+relative position correction value=231.25 μm if recognized that the peak position of the start bit is the tenth light receiving element, whereby the relative position can be correctly calculated.

The setting may be such that the discontinuous points of the phase do not exist by changing the reading of the vernier waveform depending on whether the peak position of the start bit is the odd-numbered light receiving element or the even-numbered light receiving element, whereby the relative position can be correctly calculated.

Figure 9:
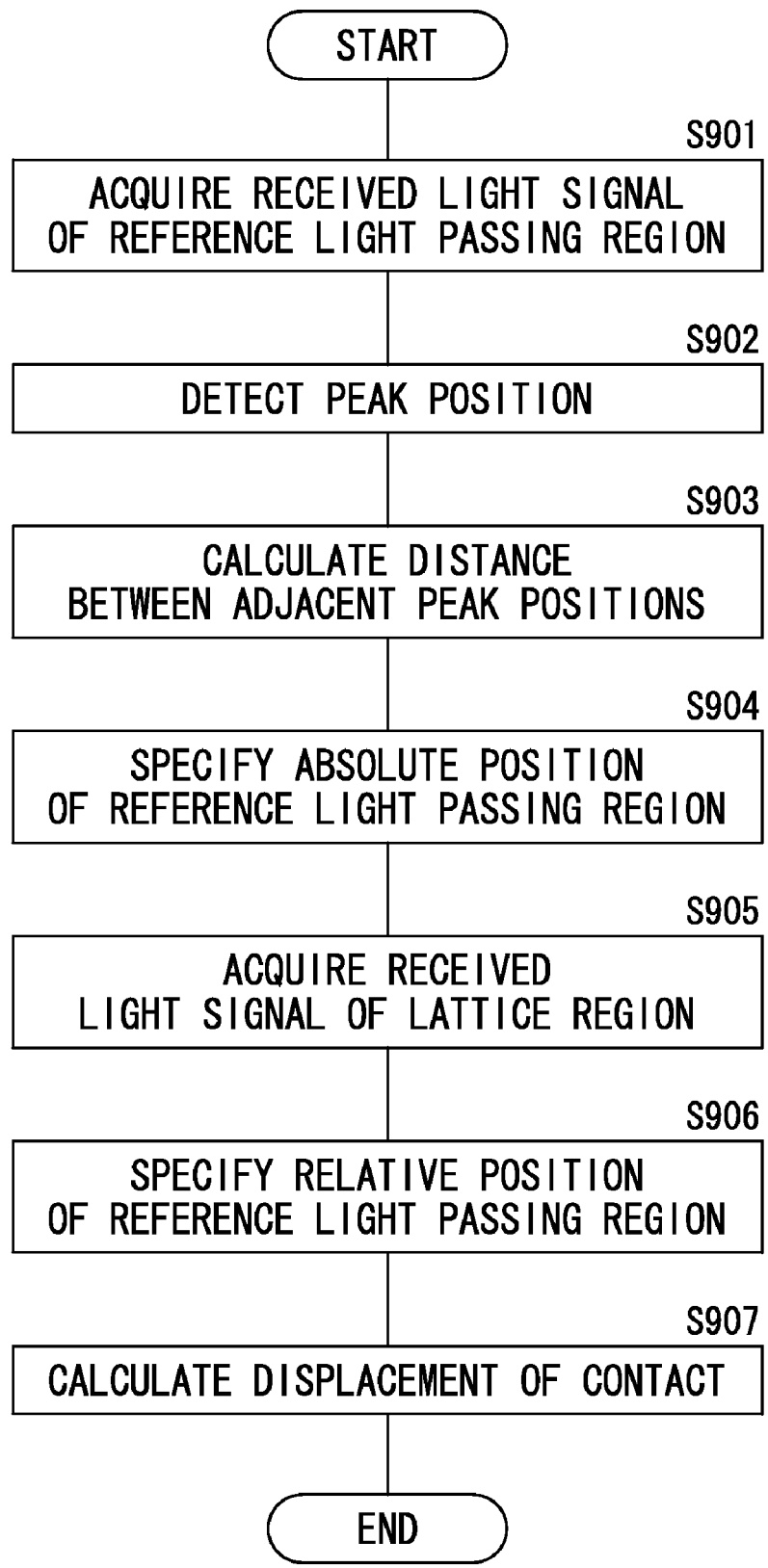
FIG. 9 is a flowchart showing the procedures of the measurement process of the CPU of the contact displacement meter according to First Embodiment of the present invention.

FIG. 9 is a flowchart showing the procedures of the measurement process of the CPU 17a of the contact displacement meter 10 according to First Embodiment of the present invention. In FIG. 9, the CPU 17a of the contact displacement meter 10 acquires the received light signal of the light passed through the reference light passing region 20 (step S901). The received light signal of the light passed through the reference light passing region 20 is the monopulse waveform described above. The monopulse waveform has a wave height value of greater than or equal to a predetermined threshold value of the received light signals of the line sensor 13, where a waveform that monotonously increases continuously for at least three or more light receiving elements along the arraying direction of the light receiving elements, and thereafter, monotonously decreases continuously for three or more light receiving elements is acquired. Thus, distinction is made from the vernier waveform, and the influence of optical noise, electrical noise, and the like are reduced.

The CPU 17a then detects the position indicating the local maxim as the peak position of the received light signals acquired as the monopulse waveform (step S902). The CPU 17a then calculates the distance between the detected adjacent peak positions (step S903), and specifies the absolute position of the reference light passing region 20 by checking with an absolute position conversion table stored in the memory 17b (step S904). Specifically, since the distances between the reference light passing regions 20, 20, all have unique values, the absolute position of the reference light passing region 20 can be specified by storing the absolute position of the reference light passing region 20 in correspondence to the distance.

The CPU 17a acquires the received light signal (vernier waveform) of the light passed through the lattice region 21 (step S905), and the relative position of the reference light passing region 20 with respect to the line sensor 13 is specified based on the acquired received light signal (step S906).

The CPU 17*a* then calculates the displacement of the contact 12 based on the specified absolute position and relative position (step S907).

The arrangement method of the reference light passing region 20 may be such that the distance between the adjacent reference light passing regions 20, 20 monotonously increases, as illustrated in FIG. 4, but the combination of the received light signal corresponding to the start bit and the vernier waveform that can be read all at once by the line sensor 13 decreases since the distance between the reference light passing regions 20, becomes larger as the displacement amount of the movement scale 16 becomes larger.

Figure 10:
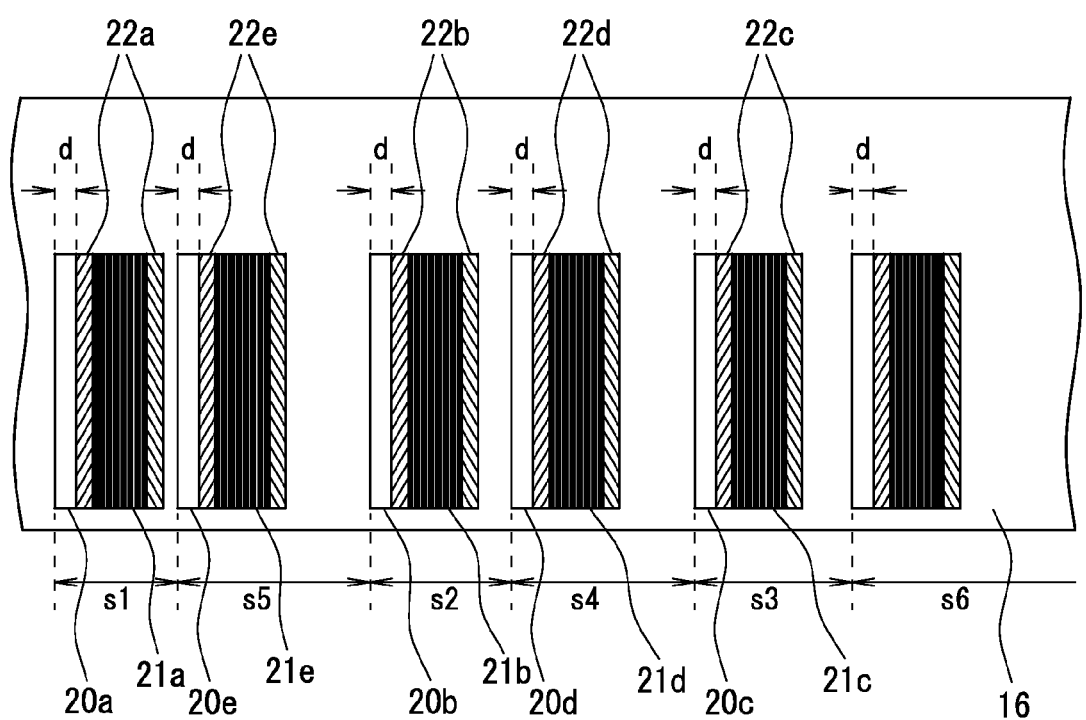
FIG. 10 is another illustrative view of the movement scale applied to the contact displacement meter according to First Embodiment of the present invention.

FIG. 10 is another illustrative view of the movement scale 16 applied to the contact displacement meter 10 according to First Embodiment of the present invention. As shown in FIG. 10, array is such that the distance s between the reference light passing regions 20, 20 is alternate so as not to monotonously increase with respect to the reading direction. For instance, if the ratio of the distance s between the reference light passing regions 20, is s1=100, s2=105, s3=110, s4=115, and s5=120, the array is such that a plurality of sets is nested as in s1→s5→s2→s4→s3 instead of the array of s1→s2→s3→s4→s5.

According to such array, the array is such that the distance between the reference light passing regions 20, 20 is averaged at a constant period, and thus spatial usage efficiency of the movement scale 16 can be enhanced. Therefore, the line sensor 13 can read out most amount of information.

According to First Embodiment described above, the absolute position can be reliably measured even in a case where the contact 12 is moved at fast speed since the absolute position of the start bit is specified based on the detection interval of the monopulse waveform corresponding to the start bit, and the accurate relative position is obtained based on the phase signal obtained from the vernier waveform.

Second Embodiment

Figure 11:
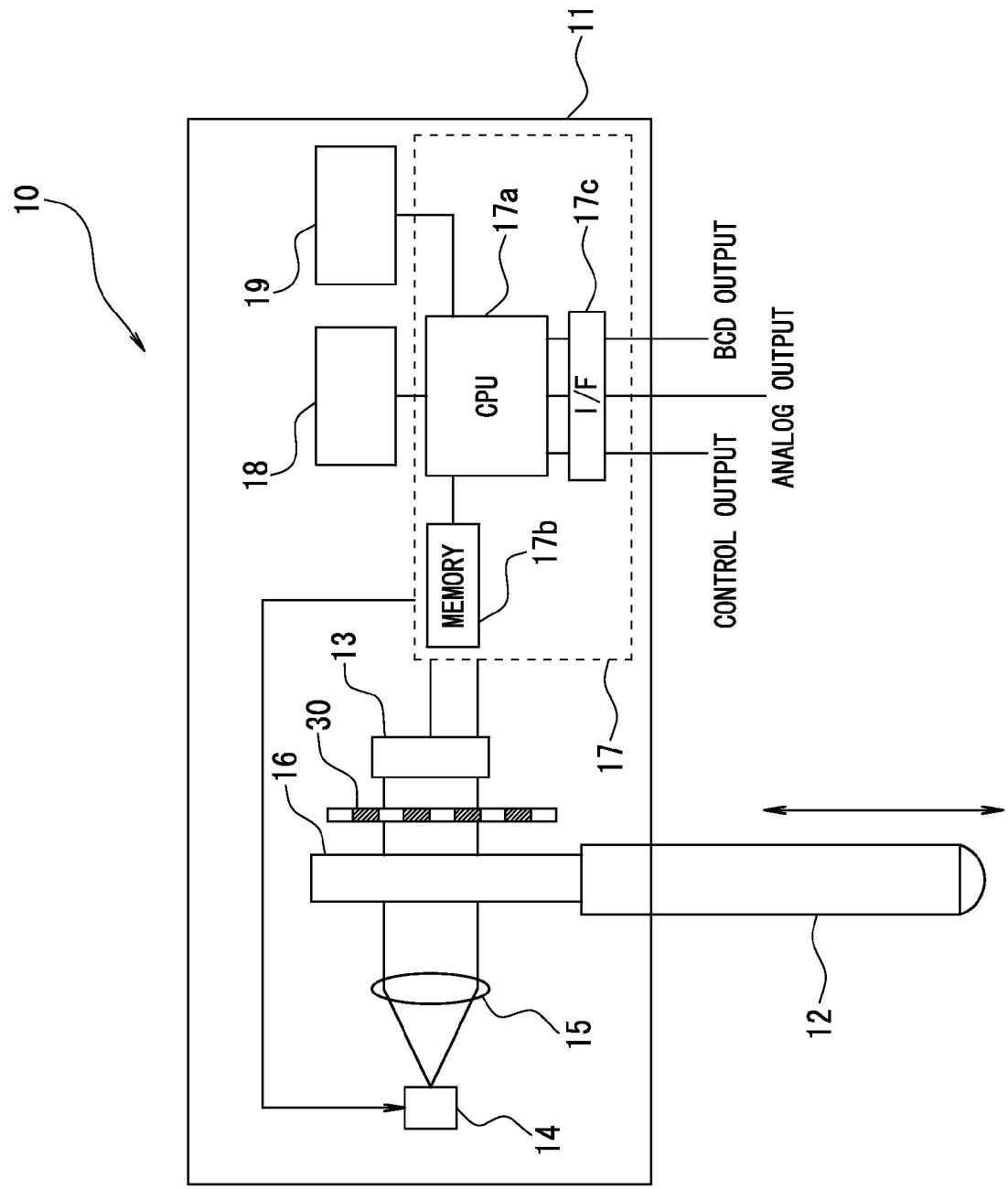
FIG. 11 is a block diagram showing a configuration of a contact displacement meter according to Second Embodiment of the present invention.

FIG. 11 is a block diagram showing a configuration of a contact displacement meter according to Second Embodiment of the present invention. FIG. 11 differs from the block diagram shown in FIG. 1 only in that a fixed scale 30 in which light passing regions and light shielding regions are alternately arrayed at substantially equal intervals in one direction is arranged on the optical path from the movement scale 16 to the line sensor 13. A periodic light receiving dead band is consequently formed on the line sensor 13 by the light shielding regions in the fixed scale 30. Therefore, the light receiving element is sandwiched by the light receiving dead band, and thus one light receiving element receives only the light passed through one light passing region.

Figure 12:
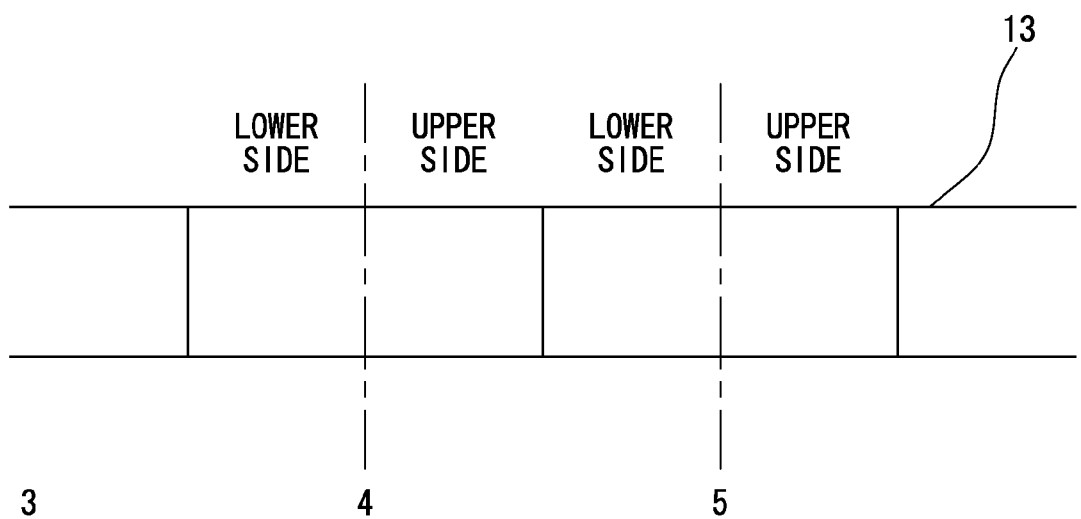
FIG. 12 is an explanatory view of the principle of the vernier rereading using the lower side and the upper side of the light receiving element.

To prevent variation of the measurement value, similar to First Embodiment, one light receiving element is divided to the lower side and the upper side, and correction is made similar to First Embodiment as the lower side and the upper side of the light receiving element in Second Embodiment. FIG. 12 is an explanatory view of the principle of the vernier rereading using the lower side and the upper side of the light receiving element.

In FIG. 12, the light receiving element is divided at 12.5 µm, which is half of the array pitch p1 of the light receiving element, and the sub-pixel interpolation is executed. If the reference light passing region 20 of the movement scale 16 is positioned at the fourth of the light receiving element, 4×25.0=100.0 µm is output as the measurement value since the array pitch p1 is 25.0 µm.

If determined that the start bit is positioned on the upper side, the value that may be taken for the measurement value is between 100 µm and 112.5 µm. Therefore, the read value of the vernier is in the range of between 0 µm and 12.5 µm.

If the read value of the vernier is around −12.5 µm in this case, the start bit can be estimated as originally being positioned at the fifth of the light receiving elements. Therefore, the read value of the vernier is reread as below from −12.5 µm to 12.5 µm.

If determined that the start bit is positioned on the upper side of the light receiving element, −12.5 µm to −11.25 µm is reread as 12.5 µm to 13.75 µm, and the correction of −11.25 µm to 13.75 µm is executed. If determined that the start bit is positioned on the lower side of the light receiving element, 11.25 µm to −12.5 µm is reread as −13.75 µm to −12.5 µm, and the correction of −13.75 µm to 11.25 µm is executed.

Through the rereading of the read value of the vernier by shifting by a pitch (½ pitch in Second Embodiment) shorter than the array pitch, carry is avoided from occurring in the vicinity of the boundary of the light receiving elements, and variation of the measurement value for one pitch can be prevented in advance.

FIGS. 13A to 13F are schematic views each showing the positional relationship of the line sensor 13 and the movement scale 16, the received light amount of each light receiving element, and the phase signal. In Second Embodiment, the width of the reference light passing region 20 is adjusted to be the length of one light receiving element.

In FIGS. 13A to 13F, the received light amount of the received light signal received by each light receiving element is relatively shown in seven stages. In FIG. 13A, the center of the reference light passing region 20 matches the center of the light shielding region in the fixed scale 30, and the movement scale 16 shifts to the right side with respect to the line sensor 13 gradually from FIGS. 13B to 13F, where the state in which the center of the reference light passing region 20 exactly matches the boundary portion between the light shielding region and the light passing region in the fixed scale 30 is shown in FIG. 13C. In FIG. 13A, if the center of the reference light passing region 20 matches the boundary portion between the ninth light receiving element and the tenth light receiving element in the line sensor 13, the received light amount of the 49th to the 55th light receiving elements of the line sensor 13, for example, are extracted as the vernier waveform.

Regarding each received light amount of the vernier waveform, the numerical values of 7, 5, 3, 1, 2, 4, 6, 7, ... are periodically repeated in order from the 49th light receiving element when the array pitch p1 of the light receiving element is 25.0 µm. Focusing on when the received light amount is "1", the position that becomes "1" shifts to the right gradually from FIGS. 13A to 13F. Using this property, the phase is defined as 0, that is, the relative position correction value as 0.00 µm when the received light amount of the 55th light receiving element is "1", −18.75 µm when the received light amount of the 49th light receiving element is "1", and similarly, as −12.5 µm, −6.25 µm, 0.00 µm, 6.25 µm, 12.5 µm, 18.75 µm, ... for the position of the 50th light receiving element, the position of the 51st light receiving element, ... etc. This example is merely schematically shown, and a finer relative position correction value can be obtained when obtaining the phase through the discrete Fourier transformation, and definition may be such that discontinuous points of the phase exist in the adjacent light receiving element as in "1" described above.

A case of FIGS. 13C to 13E in which the center of the reference light passing region 20 exists at the light passing region of the fixed scale 30 will now be described. In this case, the center of the reference light passing region 20 (peak position of start bit) is determined only with the received light amount of the monopulse waveform, and thus the detection accuracy of the peak position of the start bit is not high, and a possibility of recognizing the peak position of the start bit as the lower side of the tenth light receiving element and a possibility of recognizing as the upper side of the tenth light receiving element exist. If recognized that the peak position of the start bit is at the lower side of the tenth light receiving element, the process same as the above is carried out, and the relative position correction value is calculated according to the light receiving element for receiving the received light amount of "1". If recognized that the peak position of the start bit is at the upper side of the tenth light receiving element, the received light amounts of the 50th to the 55th light receiving elements are extracted as the vernier waveform if the process same as when recognized as at the lower side of the tenth light receiving element is performed, where discontinuous points of the phase exist and furthermore, the relative position correction value different from the actual value is calculated if the relative position correction value is calculated according to the light receiving element for receiving the received light amount of "1".

If recognized that the peak position of the start bit is at the upper side of the tenth light receiving element, the received light amount of "7" is focused on instead of the received light amount of "1". In this case, similar to when focusing on the received light amount "1", the position of the 50th light receiving element, the position of the 51st light receiving element, ... are defined to indicate −18.75 µm, −12.5 µm, −6.25 µm, 0.00 µm, 6.25 µm, 12.5 µm, 18.75 µm, ... as the relative position correction value. When focusing only on the 50th to the 55th light receiving elements, the relative position correction value can be defined as above by focusing on the received light amount "1".

The setting may be such that the discontinuous points of the phase do not exist by changing the reading of the vernier waveform depending on whether the peak position of the start bit is at the lower side or the upper side of the light receiving element, whereby the relative position can be correctly calculated.

According to Second Embodiment described above, the absolute position can be reliably measured even in a case where the contact is moved at fast speed since the absolute position of the start bit is specified based on the detection interval of the monopulse waveform corresponding to the start bit, and the accurate relative position is obtained based on the phase signal of the vernier.

When forming the light receiving dead band without using the fixed scale 30, the light receiving elements arrayed in the line sensor 13 may be arrayed and be spaced apart from each other. Effects similar to Second Embodiment are still obtained.

In First and Second Embodiments described above, the movement scale is moved by being attached to the contact, but similar effects can still be expected even in a case where the line sensor is moved by being attached to the contact, and all scale systems are fixed since the relative position merely needs to be acquired.

The present invention is not limited to the above examples, and it should be recognized that various modifications, replacements, and the like may be made within the scope of the invention.

What is claimed is:

1. A contact displacement meter that has a housing and a contact attached to the housing to be movable in one direction, and measures a displacement of the contact, the contact displacement meter comprising:
   a light emitting element;
   a line sensor with light receiving elements for receiving light emitted from the light emitting element are arrayed at a first array pitch;
   a movement scale which is arranged on an optical path from the light emitting element to the line sensor, has reference light passing regions arrayed in a line in the one direction, a light shielding portion adjacent to the reference light passing regions, and a lattice region in which light passing regions and light shielding regions at substantially equal intervals are alternately arrayed at a second array pitch different from the first array pitch in the one direction between the reference light passing regions, and moves in the one direction together with the contact, the reference light passing regions being away from each other by a distance of a unique value in the movement scale; and
   a control circuit comprising:
   a detector for detecting a peak position of the reference light passing region at which a received light signal of light passed through the reference light passing region takes a local maxim;
   a first specifier for specifying an absolute position of the reference light passing region based on a distance between the adjacent peak positions detected by the detector;
   a second specifier for specifying a relative position of the reference light passing region with respect to the line sensor based on a received light signal of light passed through the lattice region; and
   a displacement calculator for calculating the displacement of the contact based on the absolute position specified by the first specifier and the relative position specified by the second specifier.

2. The contact displacement meter according to claim 1, wherein
   a relationship between the second array pitch of the lattice region and the first array pitch of the light receiving elements is set such that one of the two continuous light receiving elements constantly receives at least part of light passing through the light passing region, and
   the second specifier includes:
   a phase detector for detecting a phase signal having the entire lattice region arrayed at the second array pitch as one cycle based on the received light signal of the light passed through the lattice region; and
   a calculator for calculating the relative position of the reference light passing region with respect to the line sensor based on the phase signal of the adjacent lattice region detected by the phase detector.

3. The contact displacement meter according to claim 2, wherein the phase detector extracts a waveform of an envelope curve of greater than or equal to at least half a cycle contained in the received light signal, and obtains the phase signal of the light passed through the lattice region based on the waveform of the envelope curve.

4. The contact displacement meter according to claim 1, wherein a fixed scale in which light passing regions and light shielding regions are alternately arrayed at substantially equal intervals in the one direction is arranged on an optical path from the movement scale to the line sensor.

5. The contact displacement meter according to claim 1, wherein the light receiving elements are arrayed and spaced apart from each other in the line sensor.

* * * * *